United States Patent [19]
Lederer et al.

[11] 3,985,824
[45] Oct. 12, 1976

[54] PROCESS FOR PREPARING IMPACT RESISTANT POLYVINYL AROMATICS

[75] Inventors: Michael Lederer, Falkenstein, Taunus; Wolfgang Strobel, Hofheim, Taunus; Horst Jastrow, Niederhochstadt, Taunus, all of Germany

[73] Assignee: Hoechst Aktiengesellschaft, Frankfurt am Main, Germany

[22] Filed: Mar. 5, 1975

[21] Appl. No.: 555,699

[30] Foreign Application Priority Data
Mar. 7, 1974 Germany.................... 2410918

[52] U.S. Cl............................. 260/827; 260/878 R
[51] Int. Cl.$^2$................. C08L 43/04; C08L 83/10; C08F 255/06; C08F 283/12
[58] Field of Search.................... 260/827, 878 R

[56] References Cited
UNITED STATES PATENTS

| | | | |
|---|---|---|---|
| 3,538,190 | 11/1970 | Meredith et al. | 260/878 R |
| 3,538,191 | 11/1970 | Meredith et al. | 260/878 R |
| 3,538,192 | 11/1970 | Bishop, Sr. | 260/878 R |
| 3,538,193 | 11/1970 | Meredith | 260/878 R |
| 3,642,950 | 2/1972 | O'Shea | 260/878 R |
| 3,663,649 | 5/1972 | Wheeler, Jr. | 260/827 |
| 3,665,052 | 5/1972 | Saam et al. | 260/827 |
| 3,678,125 | 7/1972 | Saam et al. | 260/827 |
| 3,678,126 | 7/1972 | Saam et al. | 260/827 |

*Primary Examiner*—Alan Holler
*Attorney, Agent, or Firm*—Curtis, Morris & Safford

[57] ABSTRACT

The invention relates to novel impact resistant graft copolymers of a vinyl aromatic on an ethylene/propylene/tercomponent rubber especially characterized by an improved notched impact strength and resistance to atmospheric corrosion, and a process for their preparation. Said copolymers are obtained by a two-step mass/suspension polymerization process characterized by the presence of oxygen, preferably by the presence of air, at a pressure of from 0.05 to 10 atmospheres gauge during the course of the mass polymerization step.

10 Claims, No Drawings

PROCESS FOR PREPARING IMPACT RESISTANT POLYVINYL AROMATICS

It is known that impact resistant polystyrene may be prepared according to the mass suspension process, wherein ethylene propylene tercomponent rubber (EPTR) acts as elastomer component (cf. German Offenlegungsschrift No. 1,745,945, German Auslegeschrift No. 1,247,021 and German Offenlegungsschrift No. 1,645,683). In this process products are obtained, wherein the elastomer phase is dispersed in the polystyrene matrix in the form of particles of from 10 to 20 $\mu$. These products have only a moderate notched impact strength. It has been proposed to use small quantities of a polybutadiene having a 1,2-vinyl structure additionally to EPTR (cf. German Offenlegungsschrift No. 2,048,557) Products prepared according to this process still contain unsaturated portions initiating decomposition of the polymer in the case of weathering and unfavorably affecting the toughness and the elastic properties.

It has moreover been proposed (cf. British patent specification No. 879,907, German Auslegeschrift No. 1,252,901, U.S. Pat. No. 3,632,675) to treat the solution of an elastomer component with oxygen prior to polymerization, to isolate the autoxidized rubber and to carry out the graft copolymerization with an alkenyl aromatic subsequently. These processes require a high technical expenditure and additional processing steps and are therefore economically uninteresting.

Finally it is known that polymerizations in the presence of free radical catalysts are considerably impeded by oxygen. The thermally initiated graft copolymerization of styrene on polybutadiene in the presence of atmospheric oxygen is impeded by the factor 2 to 3. Polymerizations are therefore carried out in the absence of oxygen.

It has now been found surprisingly that impact resistant products are obtained by a technically simple and economically favorable mass suspension process, by carrying out a mass polymerization in the first step of a mixture of EPTR and a vinylaromatic compound in the presence of air at a pressure of from 0.05 to 10 atmospheres gauge.

A process for preparing impact resistant vinyl aromatic graft copolymers having an improved notched impact strength and resistance to atmospheric corrosion has now been found which comprises polymerizing a monomeric vinyl aromatic or a mixture of vinyl aromatics in the presence of an ethylene propylene tercomponent rubber according to a two-step mass suspension process, which comprises carrying out the mass polymerization of the first step in the presence of oxygen, preferably in the presence of air, at a pressure of from 0.05 to 10 atmospheres gauge, preferably of from 0.1 to 3 atmospheres gauge.

Suitable ethylene propylene tercomponent rubbers are those obtained by polymerization of from 70 to 30 % by weight of ethylene, 70 to 30 % by weight of propylene and from 0.5 to 15 % by weight, calculated on the sum of the quantities of ethylene and propylene, of a diolefin as the tercomponent. Diolefins suitable as tercomponent are those having at least 5 carbon atoms and nonconjugated double bonds such as 5-ethylene norbornene, dicyclopentadiene, 2,2,1-bicycloheptadiene and 1,4-hexadiene. The EPTR is used advantageously in an amount of from 1 to 20 %, preferably of from 4 to 15 % by weight.

Suitable vinyl aromatic compounds are styrene or $\alpha$-methyl styrene as well as their derivatives carrying one or several alkyl groups containing from 1 to 4 carbon atoms in the nucleus. They are added advantageously in an amount of from 80 to 99 % by weight, preferably of from 85 to 96 % by weight, It is not necessary to add the whole quantity of the monomeric vinyl aromatic in the mass polymerization step. A part may be added in the suspension polymerization.

The oxygen is used in pure form, preferably in the form of air. The pre-polymerization (mass polymerization) is effected at an excess pressure of from 0.05 to 10 atmospheres gauge, preferably of from 0.1 to 3 atmospheres gauge.

As initiators there may be used peroxides such as alkylhydroperoxides, aralkylhydroperoxides, dialkylperoxides, diacylperoxides, peroxydicarbonates, peroxyesters, peroxyacetals and peroxyketals. Examples thereof are tertiary butylhydroperoxide, cumenehydroperoxide, 2,5-dimethyl-2,5-bishydroperoxyhexane, 1,3-diisopropylbenzene-dihydroperoxide, ditertiary butyl peroxide, ditertiary butyl cumylperoxide, dicumylperoxide, dibenzoylperoxide, dilaurylperoxide, diisopropylperoxydicarbonate, dicyclohexylperoxydicarbonate, tertiary butylperoxy-isopropylcarbonate, tertiary butylperoxypivalate, tertiary butylperoxyoctanoate, tertiary butylperoxybenzoate, the addition products of alkylhydroperoxides to aldehydes for example to acetaldehyde and benzaldehyde, to ketones such as acetone methylketone and cyclohexanone as well as its substitution products, moreover the addition products of alkylhydroperoxides or $H_2O_2$ to N-vinyl compounds such as N-methyl-Nvinyl acetamide, N-vinyl pyrrolidone, N-vinyl azetidinone-2. The aforesaid peroxides may be used alone, but a mixture of two or several, preferably of 2 or 3, peroxides may also be used.

Instead of peroxides azocompounds may also be used as initiators, for example, azobisisobutyric acid nitrile or azobisisovaleric acid nitrile. Mixtures of azocompounds and peroxides may also be used as initiators.

The initiators are added in an amount of from 0.001 to 5 % by weight, preferably of from 0.005 to 2 % by weight, calculated on the organic phase.

Antioxidants such as 2,6-ditertiary butyl-p-cresol or trisnonylphenylphosphite may be added to the polymerization starting mixture in an amount of from 0.05 to 1 % by weight, preferably of from 0.1 to 0.6 % by weight, calculated on the organic phase, furthermore plasticizers and lubricants, for example, paraffin oils, phthalic acid esters and stearic acid esters in an amount of from 0.2 to 5 % by weight, preferably of from 0.5 to 3.5 % by weight, calculated on the organic phase. Said additives may be added in the first step (mass prepolymerization) or/and in the second step (suspension polymerization).

The adding of unsaturated polysiloxanes favorably influences the elastic properties and the notched impact strength of the graft copolymerisates according to the invention.

Suitable polysiloxanes are those containing structural units of the formulae

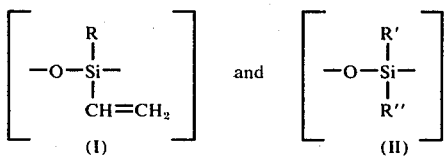

in a molar ratio of I:II from 1:4 to 1:50 and carrying terminal hydroxy groups and having an average molecular weight of from 1.000 to 5.000. R, R' and R'' each signify alkyl radicals having from 1 to 4 carbon atoms, two or three of these groups being optionally identical.

The tensile strength and the notched impact strength of the graft copolymerisates are considerably improved by adding the polysiloxanes in an amount of from 0.001 to 1 % by weight, preferably of from 0.01 to 0.5 % by weight, calculated on the organic phase.

The polymerization to be carried out stepwise is effected in the first step in the form of a mass polymerization in the presence of oxygen. This pre-polymerization is performed at temperatures of from 70° to 140° C, preferably of from 80° to 130° C, until a conversion of from 25 to 60 %, preferably of from 30 to 50 %, is obtained.

The polymerization of the prepolymerisate (reaction mixture at the end of the first step) is then continued and terminated in the second step after dispersion in an aqueous phase with the addition of initiators and in the absence of oxygen at temperatures of from 70° to 150° C, preferably of from 80° to 140° C (suspension polymerization).

Suitable dispersing agents are macromolecular water-soluble substances such as polyvinyl alcohol, polyvinyl pyrrolidone, copolymers of vinyl pyrrolidone with vinyl esters or acrylic or methacrylic acid esters, poly-N-vinyl-N-methylacetamide, the copolymers of N-vinyl-N-methylacetamide and acrylic and/or methacrylic acid esters, cellulose derivatives or known inorganic suspending agent such as tricalciumphosphate, Ca-oxalate or barium sulphate. They are added in an amount of from 0.02 to 2 % by weight, preferably of from 0.1 to 1 % by weight, calculated on the organic phase.

Said dispersing agents may be combined with small quantities of low molecular or high molecular anionic emulsifiers or wetting agents in an amount of from 0.001 to 0.1 % by weight, preferably of from 0.002 to 0.8 % by weight, calculated on the organic phase.

Moreover, there may be added in the second step besides the aforesaid initiators small quantities of water-soluble initiators such as $K_2S_2O_8$, reaction products of $K_2SO_5$ with chloroformic acid alkyl or cycloalkyl esters or water-soluble azocompounds such as the sodium salt of the azobisisovaleric acid nitrile.

Products having a finely dispersed elastomer phase are obtained according to the process of the invention, which have an improved notched impact strength and resistance to atmospheric corrosion and may be easily processed.

The following examples illustrate the invention.

EXAMPLE 1

A solution of 1,400 parts by weight of an EPTR (Content of $C_2H_4$=48.1 % by weight, content of $C_3H_6$=42.5 % by weight, content of ethylidene norbornene=9.4 % by weight) having a Mooney viscosity $ML_{1+4}$ at 100° C of 90, 12.4 double bonds per 1,000 carbon atoms (calculated from the iodine number) and an RSV (reduced specific viscosity) of 2.3 dl/g, measured on a solution of 1 g of EPTR in 100 ml of toluene at 25° C, in 11,600 parts by weight of styrene and 280 parts by weight of paraffin oil (mixture of aliphatic hydrocarbons having a boiling range of from 100° to 300° C) was charged into an autoclave. A pressure of 2 atmospheres gauge was maintained by means of compressed air. The solution was then polymerized thermally at 120° C, the stirring speed being 120 revolutions per minute, until a styrene conversion of 35% was obtained. Thereafter the air was replaced by nitrogen and the prepolymerisate was introduced by compression into a second autoclave free from air and containing 32,000 parts by weight of water, 25 parts by weight of a copolymer of N-vinyl-N-methylacetamide (91.5 % by weight) /2-ethyl-hexyl-acrylate (8.5 % by weight), 0.003 part by weight of polyethylene sulfonate and 0.13 part by weight of potassium peroxydisulfate, a solution of 73 parts by weight of tertiary butylperoctoate and 14 parts by weight of tertiary butylperbenzoate was added and the mixture obtained was polymerized for 4 hours at 90° C and for 4 hours at 130° C. The elastomer phase was dispersed in the polystyrene matrix in the form of small balls having a diameter of from 1 to 6 $\mu$. Injection molded plates were prepared at 240° C, having a notched impact strength at 0° C of 7.7 kp.cm·cm$^{-2}$ according to DIN (=German Industrial Standard) 53.453.

COMPARATIVE EXAMPLE 1

In the comparative test carried out in an analogous manner to example 1 but in the absence of atmospheric oxygen (in the course of the pre-polymerization) the rubber particles had a diameter of from 2 to 25 $\mu$ and a notched impact strength of 6.9 kp. cm· cm$^{-2}$.

EXAMPLE 2

The example was carried out as described in example 1, but with the addition of 14 parts by weight of a vinyl polysiloxane having structural units of the above-mentioned formulae I and II, wherein R, R' and R'' represent methyl groups, the proportion of the stuctural units I:II being 1:19 and the viscosity being from 25 to 55 centistokes at 25° C. In the case of the product prepared in the presence of atmospheric oxygen the elastomer phase consisted of particles having a diameter of from 0.5 to 6 $\mu$ and the notched impact strength at 0° C was 8.3 kp. cm· cm$^{-2}$.

COMPARATIVE EXAMPLE 2

In the comparative test carried out as described as in example 2 but in the absence of atmospheric oxygen in the course of the pre-polymerization the particle size of the elastomer phase was from 1 to 20 $\mu$ and the notched impact strength was 7.0 kg cm·cm$^{-2}$.

EXAMPLE 3

A solution of 4,500 parts by weight of EPTR (content of $C_2H_4$=43.8 % by weight, content of $C_3H_6$=48.2 % by weight and content of ethylidene norbornene=8.0 % by weight; Mooney viscosity=65, RSV=2.63 dl/g measured on a solution of 1 g of EPTR in 100 ml of toluene at 25° C; 10.4 double bonds per 1,000 carbon atoms calculated from the iodine number) in 38,500 parts by weight of styrene and 900 parts by weight of paraffin oil (mixture of aliphatic hydrocarbons having a boiling range of from 100° to 300° C) was subjected to compressed air at a pressure of 1 atmosphere gauge as described in example 1. The solution was polymerized at 120° C, the stirring velocity being 100 revolutions per minute, until a styrene conversion of 36 % was obtained. Thereafter the air was removed by means of nitrogen and the pre-polymerisate was introduced into a second autoclave free from air and containing 64,000 parts by weight of water, 81 parts by weight of a copolymer of N-vinyl-N-methylacetamide (91.5 parts by weight)/2-ethyl-hexylacrylate (8.5 parts by weight), 0.006 part by weight of polyethylene sulfonate and 0.4 part by weight of potassium peroxydisulfate. Then 140 parts by weight of tertiary butylperoctoate and 45 parts by weight of tertiary butylperbenzoate were added and the mixture obtained was polymerized for 4 hours at 90° C and for 4 hours at 130° C. The elastomer phase was dispersed in the polystyrene matrix in the form of small balls having a diameter of from 0.5 to 4 $\mu$. The notched impact strength at 0° C was 8.9 kg cm.cm$^{-2}$.

COMPARATIVE EXAMPLE 3

A comparative product prepared as described in example 3, but in the absence of atmospheric oxygen (in the course of the pre-polymerization) contained particles of a diameter of from 3 to 20 $\mu$ and had a notched impact strength of 7.4 kg cm.cm$^{-2}$.

What is claimed is:

1. A process for preparing an impact resistant vinyl aromatic graft copolymer having improved notch impact strength and improved stability to atmospheric corrosion which comprises the steps of partially polymerizing at least one monomeric vinyl aromatic compound in the presence of an ethylene/propylene/tercomponent rubber by mass polymerization to form a pre-polymerizate and completing the polymerization of said pre-polymerizate by suspension polymerization, said mass polymerization being carried out in the presence of an oxygen-containing gas at an elevated pressure.

2. A process according to claim 1 wherein said oxygen-containing gas is air.

3. A process according to claim 1 wherein said oxygen-containing gas is elemental oxygen.

4. A process according to claim 1 wherein said elevated temperature is 0.05 to 10 atmospheres gauge.

5. A process according to claim 1 wherein said elevated pressure is 0.1 to 3 atmospheres gauge.

6. A process according to claim 1 wherein the first step mass polymerization is carried out in the presence of one or more initiators.

7. A process according to claim 1 wherein the suspension polymerization step is carried out in the substantial absence of oxygen.

8. A process according to claim 1 wherein there is incorporated in the polymerization starting mixture from 0.001 to 1% by weight of an unsaturated polysiloxane containing structural units of the formulas:

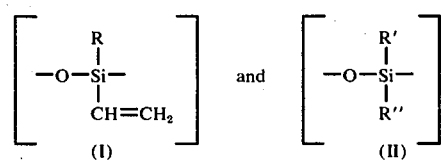

wherein R, R' and R'' each represent an alkyl group of 1 to 4 carbon atoms and the molar proportion of I:II is from 1:4 to 1:50, said polysiloxane having hydroxyl terminal groups and an average molecular weight of 1,000 to 5,000.

9. A process according to claim 8 wherein the initial polymerization reaction mixture contains from 0.001 to 0.5% by weight of said polysiloxane.

10. A process according to claim 1 wherein said mass polymerization is carried out at 70° C. to 140° C. and to a conversion of 25 to 60%.

* * * * *